Jan. 30, 1940.　　　F. G. SANCHEZ　　　2,188,374
LOADING AND TRANSPORTING APPARATUS
Filed May 7, 1938　　2 Sheets-Sheet 1
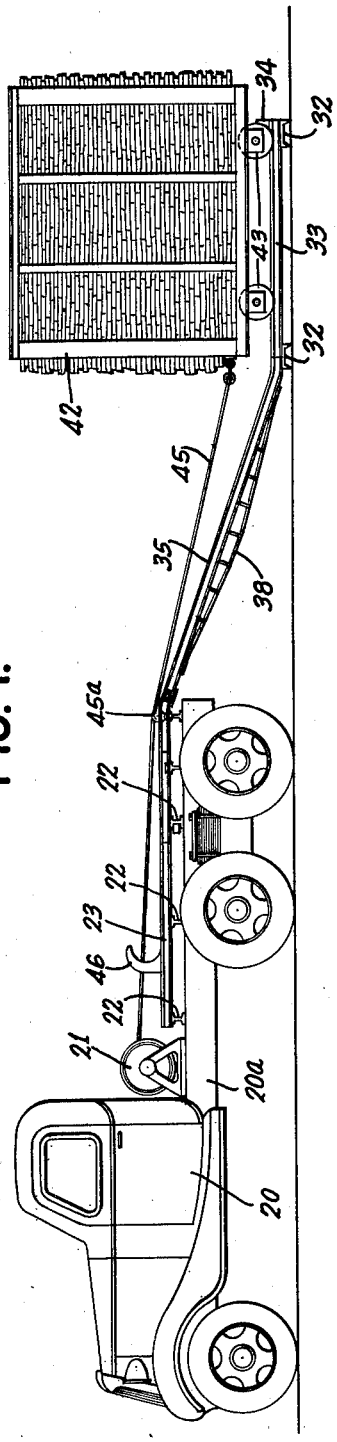
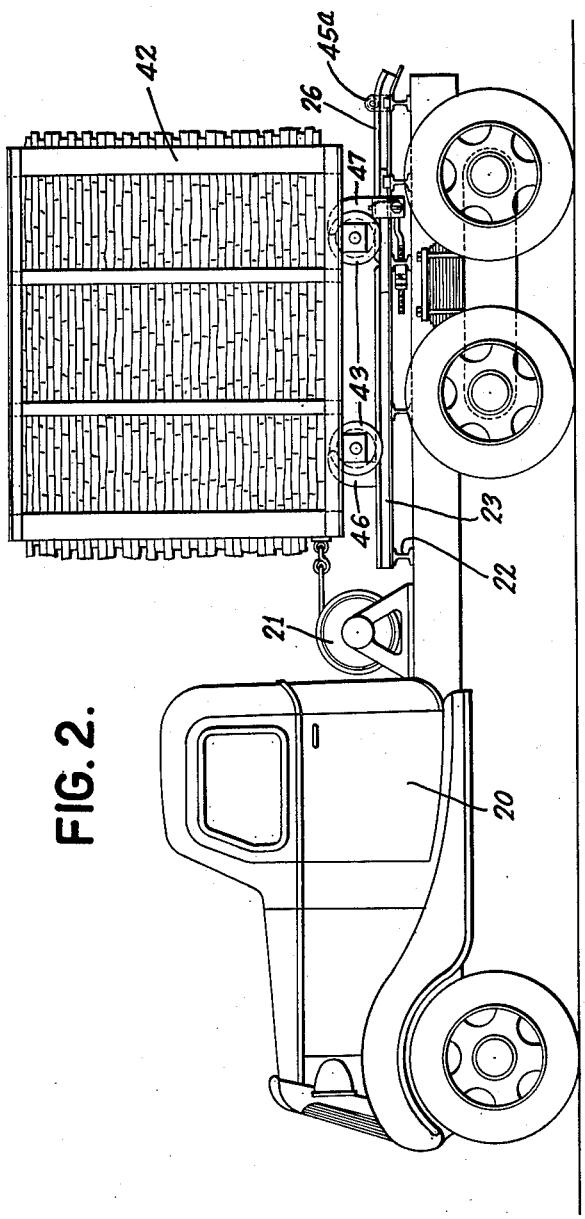
INVENTOR
FEDERICO G. SANCHEZ
BY
Cooper, Kerr & Dunham
ATTORNEYS Jan. 30, 1940.　　　F. G. SANCHEZ　　　2,188,374
LOADING AND TRANSPORTING APPARATUS
Filed May 7, 1938　　　2 Sheets-Sheet 2

INVENTOR
FEDERICO G. SANCHEZ
BY
Cooper, Kerr & Dunham
ATTORNEYS

Patented Jan. 30, 1940

2,188,374

UNITED STATES PATENT OFFICE 2,188,374

LOADING AND TRANSPORTING APPARATUS

Federico G. Sanchez, Vedado, Cuba

Application May 7, 1938, Serial No. 206,515

6 Claims. (Cl. 214—85)

This invention relates to and has for its object the provision of improved apparatus for facilitating the loading and transportation of material such as sugar cane from fields to the sugar factory or railroad.

Cane loading and transport as now practiced, is laborious and relatively expensive. Cane carts are usually employed. These are taken to the field, left there to be loaded, then hauled back to the factory or railroad. Ground conditions in the cane fields dictate large wheeled carts or caterpillar devices. Such carts are not only expensive, but while suitable for use in the fields, are heavy and necessitate slow travel from the fields to the unloading point and back.

According to the present invention the old practice is substantially modified. I first provide a transport vehicle such as a motor truck, which is adaptable for economical transport over the roads from the fields to the factory or railroad. On this vehicle there are provided support rail sections which include fixed rail sections and extension rail sections. These support rail sections are adapted to support a relatively light or inexpensive wheeled cane cage or cages. The transport vehicle in addition to carrying the cage or car, carries detachable ramp rails and a ground rail assemblage. Upon arriving at a cane field, the driver or operator first places the ground rail assemblage on the ground in proximity to and in general alignment with the frame of the transport vehicle. Thereafter the ramp rails are connected between the rear ends of the extension rails and the ground rail assemblage. To facilitate the connection the extension rails may be drawn out to desired variable extents. Thereafter the empty cage or car is rolled down off the transport vehicle over the ramp rails on to the ground rail assemblage. The vehicle operator then dismounts the ramp rails, replaces them on the transport vehicle and leaving the empty cage on the ground rail assemblage to be loaded, drives to another place on the field where there is a loaded cage already available. Here the transport vehicle is backed up to the cage, the ramp rails individually connected thereto and to the ground rail assemblage and the extension rails drawn out, if necessary. Thereafter a winch on the transport vehicle is utilized to draw the loaded wheeled cane car or cage up over the ramp rails and on to the support rails on the vehicle. The loaded cage is then securely clamped in position on the support rails to avoid its being dislodged from the rails when the transport vehicle is driven to the unloading point. Thereafter the ground rail assemblage and the ramp rails are placed on the transport vehicle. The vehicle is driven to the factory or railroad and the cage unloaded while on the vehicle. The transport vehicle carrying the empty cage is thereafter returned to the cane fields to receive another loaded cage or cages.

The foregoing general procedure permits of utilization of a number of cane cages which may be loaded by the cutters during the absence of the transport vehicle, that is to say, some cages may be loaded with cane by the cutters while other loaded cages are being transported to the factory or unloading point. Furthermore, the operator of the transport vehicle does not have to wait for the vehicle itself to be loaded with individual cane. Tying up of expensive transportation equipment is avoided.

The wheeled cane cages or cars may be of a type embodying relatively small metallic wheels, preferably of the double flange type and such cages are accordingly of a type in which the loading platform is closer to the ground than heretofore. Such a construction of cage greatly minimizes the labor of loading with cane. The cane cutters may expeditiously carry out loading operations in the cages and the transport vehicle operator does not have to load the cages with cane or wait for them to be loaded.

Accordingly, the present invention has for its general object the provision of suitable apparatus to provide for cane loading and transportation in a less laborious and less costly manner than heretofore.

Further and more specific objects of the present invention reside in the provision of an improved and simplified telescopic joint for the extension rail sections; improved joints and connections between the ramp rail sections and the extension rail sections, which among other features, include means preventing lifting up and undesired disconnection of the ramp rails from the extension rails when the car or cage is being drawn up on the transport vehicle; improved securing means for the extension rail sections, which while permitting extension of such sections, prevent substantial lateral movement, tipping or rocking movement when such sections receive a load; improved stronger and lighter ramp rail sections; and improved and novel cage securing means to hold the cage in secure position upon the support rails of the transport vehicle during transport.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figure 1 is a side elevational view showing the transport vehicle with the ramp rails attached thereto and with a cane cage on the ground rail sections ready for loading on the transport vehicle;

Fig. 2 is a side elevational view showing the cane cage secured in position on the transport vehicle;

Figure 3:
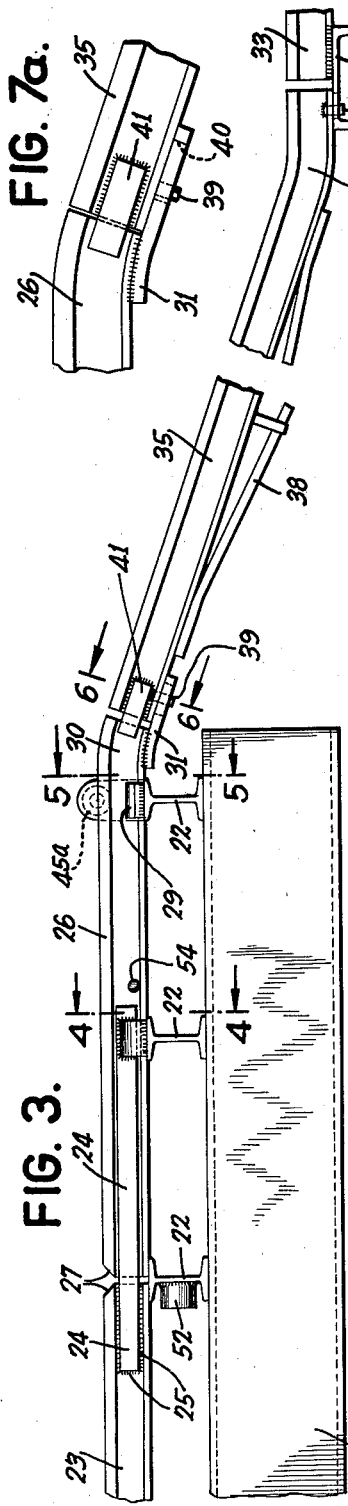
Fig. 3 is a side elevational detail view of the rail sections shown in Fig. 1 and including the fixed rail sections, the telescoping sections, the ramp rail sections, and a portion of the ground rail section.
Figure 4:
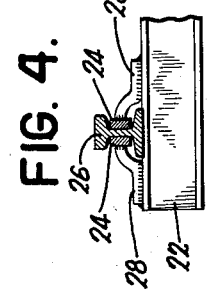
Fig. 4 is a sectional detail view taken on line 4—4 of Fig. 3 and looking in the direction of the arrow.

In more detail in the drawings, 20 designates a transport vehicle which may be of any desired form. It is here shown as a motor truck, although it may be of other form. Preferably the motor truck is provided with a conventional power driven winch designated 21. Detachably secured to the side frames of the transport vehicle in any desired manner, as by suitable bolt fastenings such as 22a (Fig. 8) are a number of cross transoms such as 22. These may be in the form of I-beams. The transoms are preferably detachable from the vehicle frame to permit the use of the transport vehicle for other purposes when sugar cane is not being transported. Fixed to the transoms in any suitable manner, as by welding, are a pair of rail sections, one at each side of the truck. 23 designates one of such fixed rail sections (see also Fig. 3). Each of the fixed rail sections at its rear end has secured thereto two fish plate-like members 24. Such plates 24 are disposed one at each side of the web of the rail sections 23 and preferably are secured thereto by welding between the plates and the head and base of the fixed rail sections, said welding being indicated at 25 in Fig. 3. To the rear of the fixed rail sections 23, are a pair of what may be termed "extension rail sections", 26 designates one of these extension rail sections. Each extension rail section has its web fitted between the fish plates 24 of the fixed rail section (see Fig. 4).

Figure 6:
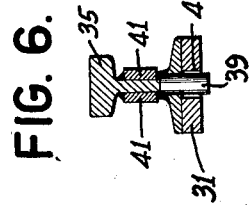
Fig. 6 is another detail sectional view taken on line 6—6 of Fig. 3.
Figure 5:
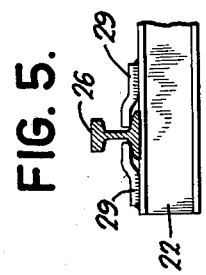
Fig. 5 is a detail sectional view taken on line 5—5 of Fig. 3 and looking in the direction of the arrow.

This construction provides a telescopic joint between the extension rail section 26 and the fixed rail section 23. Preferably chamfering is provided on the front ends of the extension rail sections and on the rear ends of the fixed rail sections as indicated at 27. To support the extended rear ends of the fish plates or members 24 clips 28 may be provided, which clips are preferably welded to the underlying transoms 22 and also welded to the members 24. The rearmost transom is provided with clips 29 (Fig. 5) secured in any desired manner as by welding thereto and these clips have flanges which overlie the base of the extension rail sections 26. The extreme rear end of the extension rail sections is bent downwardly somewhat as indicated at 30, and beneath the base of these downwardly bent sections 30 there are welded plate-like members 31 (see Figs. 3 and 6).

The foregoing parts comprise the supporting rail elements of the structure which are invariably carried and supported upon the transport vehicle.

Referring again to Fig. 1, the ground rail assemblage preferably comprises several transverse channel-like members 32. Fixed to these channel members are a pair of ground rails 33. A limiting stop of any suitable form such as 34 may also be provided. The ground rails 33 at their forward end extend substantially half-way over the forward channel. The remaining forward part of the channel affords a seat for the ramp rails (see Fig. 3). The ramp rail assemblage includes a pair of individual ramp rails 35 which are bent somewhat as indicated at 36 at a point near the lower ends thereof. Beyond the bent portion each ramp rail is provided with a pin 37 fixed in and depending from the base. This pin is adapted to fit in an elongated hole in the channel 32. To provide increased rigidity for each of the ramp rails each rail is provided with a supplemental truss member 38. This may be in the form of a round rod welded to the base of each ramp rail adjacent the ends thereof. Suitable posts space the truss from the base of the ramp rail at points intermediate the ends. The upper end of each ramp rail 35 is provided with a pin 39 which is adapted to fit in an elongated slot 40 in the plate 31. The upper ends of each ramp rail also have welded, or otherwise secured thereto, a pair of plates 41, which plates are spaced apart and extend into cooperation with each side of the web of each extension rail 26.

In the cutting and transportation of sugar cane, several ground rail sections 32, 33 are provided. Numerous cages 42 are also provided. The cages 42 are of conventional form having the customary supporting wheels 43.

At a point where cane is to be cut and loaded, a ground rail assemblage 32, 33 is placed and this ground rail assemblage supports an empty cane cage. The cane is then cut and the cages are loaded in the customary way. Inasmuch as the floor of the cage is close to the ground, loading in the cane fields is facilitated. After a cage is completely loaded the transport vehicle is driven to the field. The operator of the vehicle backs up the transport vehicle to generally align the frame of the vehicle with the ground rails 33 of the ground rail assemblage.

Figure 7A:
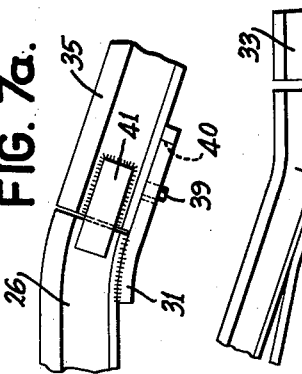
Fig. 7a is a view like Fig. 7 but with the parts in a moved or shifted and interlocking position.
Figure 7:
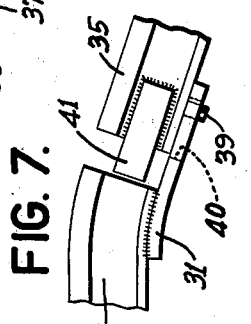
Fig. 7 is a detail view of certain parts shown in Fig. 3, but on an enlarged scale and showing the parts in the "connecting up" position.
Figure 9:
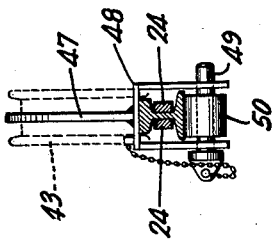
Fig. 9 is a detailed end elevational view of certain parts on Fig. 8, the view being taken substantially on line 9—9 of Fig. 8 and looking in the direction of the arrow.
Figure 8:
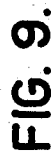
Fig. 8 is an enlarged detail view of the cage securing means shown in a smaller scale in Fig. 2.

It will be appreciated that it is difficult to accurately align the truck or transport vehicle with the ground rail assemblage and to expedite the making of connections with the truck slightly out of alignment, the extension rail sections are utilized. These may be drawn out to a substantial extent (in practice about a foot). One extension may be drawn out to a somewhat further extent than the other extension and in this way the making of ramp rail connections is facilitated. The transport vehicle operator then connects each ramp rail asemblage at the lower end to the ground rail assemblage and at the upper ends to the extension rails. Assembly of the ramp rails to the extension rails and to the ground rail assembly may be effected by first engaging pin 37 of each ramp rail in the elongated hole in channel 32. Each pin 39 is likewise engaged in the longitudinal slot 40 of member 31 (see Fig. 7). The closed end slot 40 is of sufficient length to allow the parts 41 to pass by the head of the rail sections 26. This slot 40 will also afford disconnection to the parts upon drawing out a ramp rail until the pin 39 is in the outer end of the slot as shown in Fig. 7. Having connected up the parts as above explained the operator connects the winch cable 45 to the cage, such cable passing over a roller 45a and places the power winch 21 in operation. When initial tension comes on the cable to the cage, the rails 35 and 26 come together (see Fig. 7a). The parts 41 slide under the head of the rail 26 thereby subsequently preventing rail 35 from disengaging from the seat 31 on the rail 26. Also the extension rails may slide inward until they touch the fixed rails 23. Clips 29 (Figs. 3 and 5) and clips 28, together with fish plates 24 (Fig. 4) allow longitudinal in and out sliding movement of the extension rails 26 and also substantially prevent lateral movement or upward movement of the extensions 26. Upward movement at 6—6 tends to occur when the extensions receive compression from the ramp rails. When the load of the cage comes on the ramp the extensions tend to rock in a clockwise direction, but such movement is prevented by the fish plates 24 and clips 28. The cage 42 is finally completely drawn up off the ground rail assemblage up the ramp rails and on to the supporting rail sections of the transport vehicle. In such drawing up operations the telescopic sections may close up, eventually assuming the position indicated in Fig. 3. If they do not, the fish plates 24 will bridge the gap and afford a track for the wheels of the cage. The cage 42 is finally wholly upon the truck. Its forward wheels are in cooperation with forward wheel or limit stops 46. Such stops 46 are preferably welded to the rails. To block and clamp tightly the rear wheels of the cage and to bring the front wheels of the cage into cooperation with the forward wheel stops the following construction is provided. 47 designates a rear wheel stop plate, such stop plate 47 is secured at its base to a channel-shaped saddle member 48. Extending through the flanges of the saddle 48 is a removable pin 49. With this pin removed, the saddle 48 may be placed over a rail. The pin is then reinserted through the flanges of the saddle and also through an eye 50 of a link 51. Link 51 is threaded at its forward end as shown in Fig. 8 and such link passes through a drilled opening in one of the transoms. Beyond the transom there is a collar member 52 adapted to abut against the transoms and beyond the collar member there is a spanner nut 53. The operator having placed each removable wheel stop in position and having connected the same to the members 51, then tightens up each spanner nut 53. This draws the movable wheel stops 47 up into cooperation with the rear wheels of the cage and crowds the cage forwardly into clamping contact with the forward wheel stops 46.

It will be understood that the fixed stops 46 and the replaceable stops 47, both have parts which curve up over the wheel rims. Accordingly, tightening up of the replaceable stops and upon endwise shift of such stops the curved stop parts of both the fixed and adjustable stops crowd the wheels tightly down upon the supporting rails. It will be understood that with the pins 49 in place through the eyes 50 the adjustable stops will be held down inasmuch as such parts engage under the base of the rails in contact with them. When a cage is to be removed from the transport vehicle, the pins 49 are removed wherein the adjustable wheel stop assemblies may be removed. Such pins are easily removable after tension is taken off by slightly backing up or unscrewing the spanner nuts 53, with the adjustable stops in tightened up position. The loaded cage is securely fastened to the transport vehicle and held in such a way that it will not be dislodged from the supporting rails during transportation to the sugar mill or other unloading point.

The final operation is to disconnect each of the removable ramp rails and to place these ramp rails together with the ground rail assemblage on the transport vehicle. This transport vehicle or truck is then driven off.

When the truck returns to the cane fields with an empty cage, the operations are reversed. The ground assemblage is placed in position on the ground. The ramp rails are then connected up. The extension telescopic sections may be drawn out to facilitate ease of connection. The adjustable and replaceable stops are removed. The empty cage is then lowered from the truck and run down the ramp rails to the ground rails. Thereafter the truck may be driven to another point and be loaded with a filled cage. This manner of operation greatly decreases the cost of loading and transporting of sugar cane because of considerable time saved.

While in the drawings there has been shown an arrangement wherein a single loaded cage is carried on the transport vehicle, it is obvious that more than one loaded or empty cage may be carried at a time. When a plurality of cages are to be so carried, the rail sections are extended in length to accommodate the plurality of cages and additional wheel stops are utilized to secure the cages in position. To prevent inadvertent disconnection of the extension rail sections from the ramp rail section a pin such as 54 may be provided, which pin is adapted to contact with the chair 29 and thus limit the extent to which a ramp rail may be drawn out.

It may be further mentioned that in the event that the extension sections do not telescope and close up, which closing up, however, almost invariably occurs, the fish plates 24 will provide a bridging track over which the cage wheels may run. In such case the wheels will run down the incline 27, then run across the fish plates 24 and then up the other incline 27.

What I claim is:

1. In an apparatus of the character described, including a transport vehicle with the usual frame, transoms across said frame, spaced rail sections fixed to said transoms, other extensible rail sections loosely connected to the fixed rail sections so as to be movable individually longitudinally relatively to the fixed rail sections, said extensible rail sections being supported by, but being movable with respect to the transoms, the connections between the fixed and the extensible rail sections including pairs of fish plates fixed to the webs of the fixed rails slidably receiving therebetween the webs of the extensible rail sections, ramp rails operably connected to the other ends of the movable extensible rail sections adapted for connection with a ground rail assemblage, and means to prevent complete disconnection of the extensible rail sections from the fixed rail sections.

2. An apparatus of the character described to provide loading and unloading of a wheeled cage on and off a transport vehicle, comprising a transport vehicle, fixed rail sections thereon, a ground rail section assemblage including spaced rails upon which the wheeled cage may rest, extension rail sections each cooperating with a fixed rail section and longitudinally extensible therefrom, ramp rail members each connectible and disconnectible to and from the extension rail sections and also to and from the ground rail section assemblage, said apparatus including as means for affording substantial extension of the extension rail sections, a pair of fish plates fixed to the webs of the fixed rail section for slidably receiving the webs of the extension rail sections and limiting stop means to prevent complete disconnection of the fixed and extensible rail sections.

3. An apparatus of the character described to provide for the disposing of a wheeled cage on and off a transport vehicle and providing for the transport of said cage together with rail parts upon the transport vehicle, said apparatus including a transport vehicle comprising a frame, a plurality of cross transoms supported by and removable from said frame, supporting rail sections comprising portions extending longitudinally of the vehicle and secured to said transoms, seat portions for ramp rails upon the terminating rear ends of the supporting rail portions, ramp rail sections provided with means affording connection and disconnection of said ramp rails and seats, a portable ground rail assemblage adapted for disposition as a unit upon the ground and provided with spaced rails, cross tie members and seat portions for the reception of the ramp rails at the forward end of the ground rails and means providing for the connection and disconnection of the ramp rails to and from the seat portions of the ground rail assemblage.

4. The invention set forth in claim 3 wherein the seat portions of the supporting rails upon the transport vehicle are disposed upon rail sections which are longitudinally extensible from the fixed rail sections upon the vehicle, said extensible sections being connected with a lost motion connection to the fixed rail sections to provide for longitudinal extension but maintained connection to the supporting rail sections, and fixed clip means extending over the bases of the extensible rail sections to allow sliding longitudinal movement, but preventing substantial lateral or upward movement of the extensible sections.

5. An apparatus of the character described to provide for the loading of a cage at ground level and for the transport of a cage upon a transport vehicle, comprising a transport vehicle provided with a frame having fixedly secured thereon substantially horizontally disposed rail sections adapted to receive for transport a double flanged wheel cage, which cage is shiftable to ground level for loading, means to provide for the shifting of the cage to and from the vehicle, said means comprising a portable ground rail section assemblage and portable ramp rails, said assemblage and each ramp rail being provided with means whereby the ground rail assemblage may be connected to the ramp rails and whereby the ramp rails may be connected to the supporting rails upon the vehicle when a cage is to be shifted from the transport vehicle to the ground rail assemblage or from the ground rails to the transport vehicle, said means also providing for the disconnection of the ground rail assemblage from the ramp rails and for the disconnection of the ramp rails from the supporting rails upon the transport vehicle so that said ramp rails and portable ground rail assemblage may be disconnected from each other and the ramp rails disconnected from the transport vehicle so that the rail parts may be transported upon said vehicle with a loaded or unloaded cage, the aforesaid means affording connection and disconnection of the ramp rail sections to and from the supporting rail sections, including inter-engaging means between the ramp rail sections and the supporting rail sections to prevent disconnection by upward lifting of the ramp rail sections when pull is initially exerted on the cage which tends to lift up the upper end of the ramp rail sections.

6. An apparatus of the character described comprising a transport vehicle, spaced rail sections rigidly fixed thereon and extending substantially horizontally and lengthwise of the transport vehicle, extension rail sections adapted for longitudinal extension only to various substantial extents and cooperating with said fixed rail sections and maintained in connection therewith, ramp rails arranged for individual connection and disconnection to and from each extension section, a portable ground rail section assemblage comprising spaced rails connected by supporting cross ties with which assemblage the ramp rails are also adapted for connection and disconnection whereby a continuous track is afforded upon which a cage may be displaced off and on the transport vehicle and whereby the rail parts may be disconnected for transport with the cage upon the vehicle.

FEDERICO G. SANCHEZ.